Patented Nov. 23, 1943

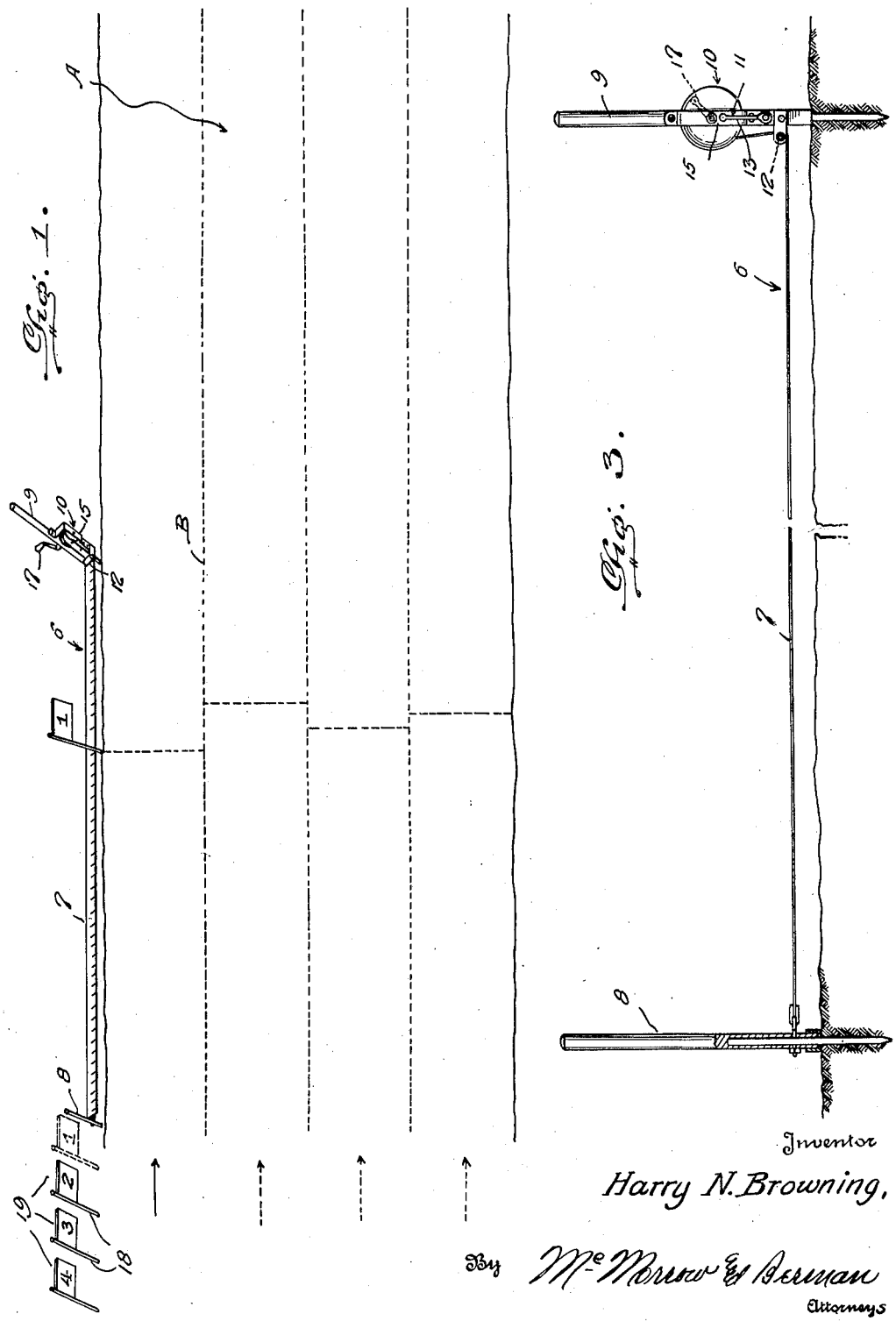

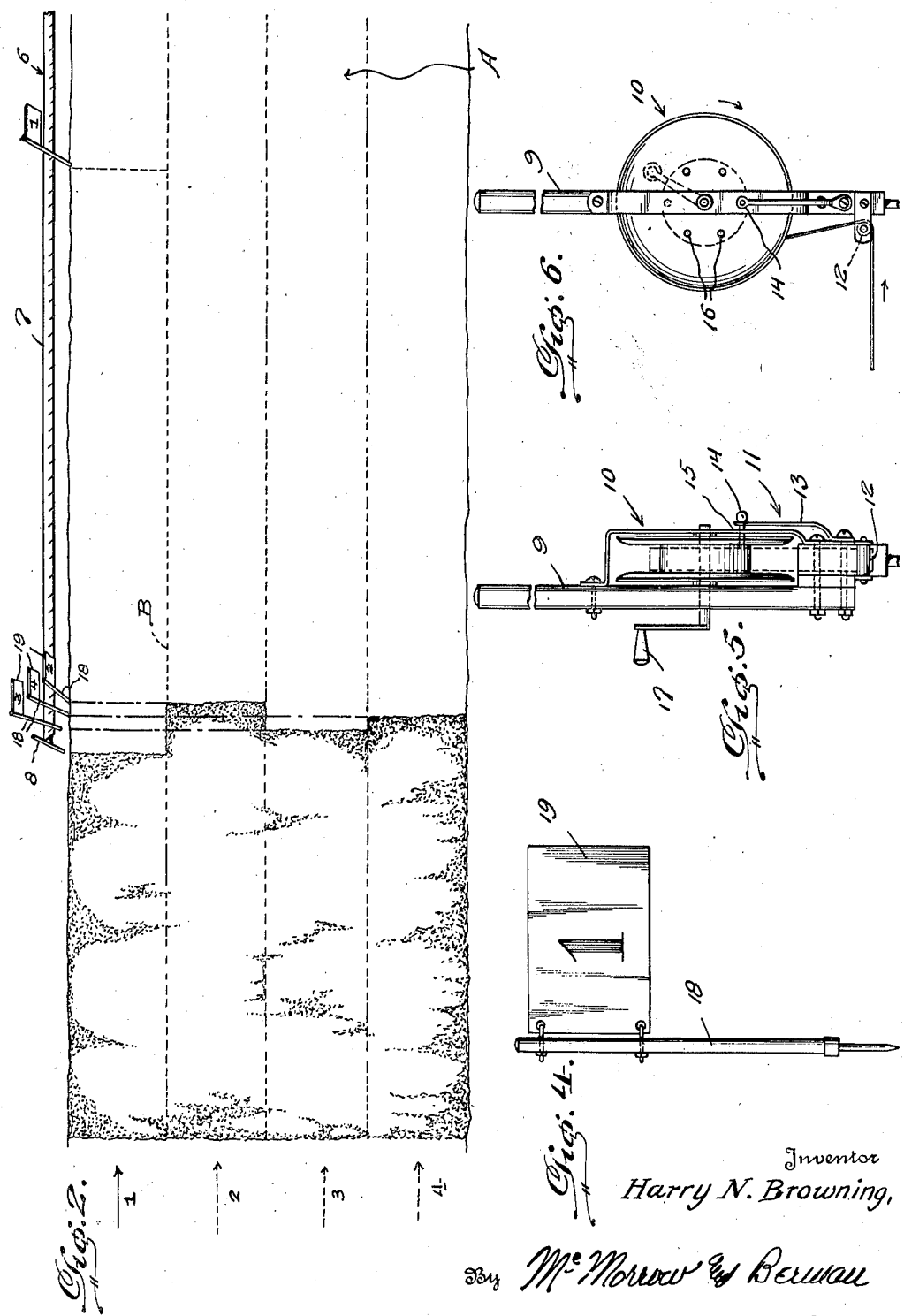

2,335,105

UNITED STATES PATENT OFFICE 2,335,105

TAPE REEL

Harry N. Browning, Emmett, Idaho

Application January 19, 1942, Serial No. 427,379

1 Claim. (Cl. 33—138)

This invention relates to a method and an apparatus for aiding in the placing of predetermined quantities of material for coverage of roadbeds and other areas.

The primary object of this invention is the provision of definite information as to the amount of material of each load at the time of arrival at the area to be built or covered and a measuring and indicating means, consisting of a portable measuring tape having thereon a scale denoting the distances different amounts of material will cover when the width and depth of the material coverage has been previously determined and a plurality of differentiating portable indicators for indicating the points on the area for the deposit of said material.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a diagrammatical view, illustrating the apparatus and a fragmentary portion of an area to be covered by material in accordance with the present invention.

Figure 2 is a view similar to Figure 1, showing a part coverage of a fragmentary portion of the area with the material and illustrating the apparatus associated therewith.

Figure 3 is a side elevation, partly in section, showing the measuring means.

Figure 4 is a side elevation illustrating one of the portable indicators.

Figure 5 is a fragmentary front elevation, showing a reel forming a part of the measuring means.

Figure 6 is a fragmentary side elevation illustrating a reel and the latching means therefor.

Referring in detail to the drawings, the character A indicates a fragmentary portion of an area to have a material coverage applied thereto in accordance with the present invention. 5 indicates a measuring device, consisting of a scale bearing tape 7, portable impaling stakes 8 and 9. The stake 9 carries a reel 10 including a latch 11. One end of the tape is secured to the reel, whereby slack in the tape may be taken up or the tape paid out when desired. The other end of the tape is suitably secured to the stake 8.

A guide pulley 12 is carried by the stake 9 over which the tape passes and acts to support the tape with the scale markings disposed uppermost for convenient reading by a person standing adjacent the tape. The latch 11 includes a spring arm 13 equipped with a finger piece 14 and a pin 15 at its free end. The pin is adapted to enter any one of a series of openings 16 provided in the reel 10 to releasably secure the latter for rotation manually by a crank handle 17. The stakes 8 and 9 are provided with pointed ends to facilitate the insertion thereof in the ground.

A plurality of portable indicators are employed and each includes an impaling stake 18 and a flag 19. The flags of the indicators are of different colors, such as red, white, blue and yellow, so that they may be easily distinguished from each other and also are provided with different numbers or characters.

In carrying out this invention, the area to be covered with material is divided into a number of lanes by lines B, each lane being of a determined width. It is preferable that the widths of the lanes be approximately the same as that of vehicles employed for hauling the covering material from the source to said area. The lanes will be numbered in accordance with the numbers of the indicators.

A person known as a "checker" is employed who will meet the first vehicle at the beginning or entrance of the first lane which will be the lane next to the left hand side of the area. The checker will have previously arranged the measuring tape to parallel the first lane, with the stake 8 positioned in the ground at the entrance of the first lane with the various indicators grouped adjacent thereto. The stake 9 is inserted in the ground to render the tape taut and parallel to the first lane and to the left thereof, as shown in Figure 1. The checker receives from the driver or operator of the first vehicle a manifest setting forth the amount of material of the load of said vehicle. The checker noting the amount of the load, then proceeds to the group of indicators and obtains the indicator bearing the number one, the flag of which is preferably red in color and inserts said indicator in the ground opposite the scale marking of the tape corresponding to the amount of material of the load of said vehicle.

The positioning of the first indicator as specified, will indicate to the driver of said vehicle the place in the first lane where the load is to be deposited, the driver then carries out said unloading operation. The load of material placed in said first lane will cover from the entrance thereof to the indicator 1 when spread. The same procedure is carried out by the checker in connection with the second vehicle to arrive and with the second lane. However, the amount of material of the second vehicle may be more or less than the amount of the load of the first vehicle. In this instance the amount of the load of the second vehicle is more than the amount of the load of the third vehicle. The checker secures the manifest from the driver of the second vehicle and noting the amount of the load then obtains the second indicator, that is, the indicator bearing the character two and white color and positions said second indicator in the ground opposite the scale marking corresponding to the amount of the second load. This is shown in Figure 2.

The procedures as previously described are carried out by the checker in connection with the following lanes and vehicles to arrive at the areas 3 and 4. When the last or fourth lane has had the load of material deposited thereon, the checker rearranges the measuring tape, so that the stake 8 will be opposite the indicator closest to the entrance of its respective lane which in the present showing will be the first flag and make the tape taut by repositioning of the stake 9 further along the area adjacent and parallel to the first lane. It is to be understood that the drivers of the vehicles have been schooled or instructed to always enter the lane where the indicator thereof is positioned closest to the entrance.

In the present showing, the driver of the next or fifth vehicle on arriving at the area notes that the indicator bearing the character 1 is the closest to its entrance and drives into the first lane and the checker is given the manifest of the amount of the load of material of said latter-named vehicle. The checker then removes the indicator 1 from its previous position and repositions it opposite the scale marking of the tape corresponding the amount of the fifth load, indicating to the driver where the latter load is to be deposited. The checker follows out the same procedure in connection with the following loads of material and the lanes, always adjusting the tape so that the stake 8 thereof will be opposite the indicator closest to its entrance after each load has been deposited in accordance with the previous arrangement of indicators.

From the foregoing description, taken in connection with the drawings, it will be seen that the present invention includes an extremely practical and efficient method and apparatus which will permit accurate and rapid depositing of coverage material within a selected area, so that said area may be covered with the material with wastage reduced to a minimum.

While I have shown and described the preferred embodiment of my invention, it will be understood that minor changes in construction, combination and arrangement of parts may be made without departing from the spirit and scope of the invention as claimed.

Having thus described the invention, what I claim is:

In a measuring device, a stake including a laterally arranged offset adjacent one end thereof, an impaling pin secured to said offset and extending beyond said end of the stake, a bracket secured to one face of the stake and to the offset and having a portion thereof spaced from said face of the stake and provided with an opening, a manually rotatable shaft journaled in said portion of the bracket and in the stake, a measuring tape-carrying reel secured to said shaft between said portion of the bracket and the stake and provided with a series of openings movable into and out of alignment with the opening of said portion of the bracket during the rotation of the reel by the shaft, a spring arm secured at one end to the offset and paralleling said portion of the bracket, a pin carried by the arm and normally urged thereby through said opening of the bracket into the opening of the reel positioned in alignment with the opening of the bracket, and a finger piece secured to the arm opposite the pin to permit manual flexing of the arm to disengage the pin from an opening of the reel.

HARRY N. BROWNING.